United States Patent
Matthews et al.

[11] Patent Number: 6,084,858
[45] Date of Patent: Jul. 4, 2000

[54] DISTRIBUTION OF COMMUNICATION LOAD OVER MULTIPLE PATHS BASED UPON LINK UTILIZATION

[75] Inventors: Wallace E. Matthews, Northwood; Roger Dev, Durham, both of N.H.; Alex Edward Raj, Westford, Mass.

[73] Assignee: Cabletron Systems, Inc., Rochester, N.H.

[21] Appl. No.: 08/790,467

[22] Filed: Jan. 29, 1997

[51] Int. Cl.⁷ .............................. G06F 11/00; H01J 13/00
[52] U.S. Cl. ..................... 370/238; 370/351; 709/235; 709/238
[58] Field of Search ........................... 370/238, 252, 370/254, 255, 256, 351, 389, 400, 408, 237; 395/200; 709/232, 234, 233, 235, 238, 241, 243, 244

[56] References Cited

U.S. PATENT DOCUMENTS

| | | | |
|---|---|---|---|
| 5,115,495 | 5/1992 | Tsuchiya et al. | 395/200 |
| 5,233,604 | 8/1993 | Ahmadi et al. | 370/238 |
| 5,521,910 | 5/1996 | Matthews | 370/54 |
| 5,535,195 | 7/1996 | Lee | 370/256 |

OTHER PUBLICATIONS

Ronald O. Brown, "Network Reliability and Availability: Tricky Calculations Mean Managers Frequently Do Not Get What They Need", *Manager's Notebook,* part 1, pp. 1–5 and part 2, pp. 1–5, Dec. 27, 1995.

*Primary Examiner*—Alpus H. Hsu
*Assistant Examiner*—Afsar M. Qureshi
*Attorney, Agent, or Firm*—Wolf, Greenfield & Sacks, P.C.

[57] ABSTRACT

A method for selecting a communication path over which to send a communication load between a first station and a second station in a communication network, in which the communication network has a plurality of possible communication paths between the first and second stations. The method comprises identifying at least one of the possible communication paths between the first and second stations, determining a first path metric for each identified path, the first path metric having a value that may vary as distribution of the load across the network varies and selecting one of the at least one identified paths based on the value of the first path metric for each identified path.

41 Claims, 3 Drawing Sheets

DISTRIBUTION OF COMMUNICATION LOAD OVER MULTIPLE PATHS BASED UPON LINK UTILIZATION

BACKGROUND OF THE INVENTION

1. Field of the Invention

This invention relates generally to communications networks, and more particularly to a method of distributing communication loads over multiple alternative paths.

2. Discussion of the Related Art

In an internet, several networks are connected together through the use of gateways and an internetworking protocol. The gateways (often called routers) using the protocol hide the underlying details of the actual networks in order to provide uniform service across the network. TCP/IP is a leading protocol suite for communicating across interconnected networks. "TCP" stands for transmission control protocol, a connection-oriented transport service, while "IP" stands for internet protocol, a connectionless-mode network service.

A connectionless-mode network protocol is typically packet-based. When some entity on the network wishes to send data, it sends that data as a series of packets ("packet" refers to data transmitted in discrete parts, and includes what is known in this art as "packets," "cells," "datagrams" and the like). Associated with each packet is an address indicating where the packet should be delivered. The address may be a unique Media Access Control address ("MAC address") assigned to the station to which the packet will be delivered. An IP packet encapsulates the data and other information necessary to deliver the packet to the IP entity at the destination. The destination IP entity receives the packet, strips off the data, and passes it up to an appropriate upper-layer protocol for processing. See M. Rose "The Simple Book—An Introduction to Management of TCP/IP-Internets," Prentice Hall, 1991.

More recently, there has been a move toward switched networks which provide a connection-oriented service. A discussion of how "virtual connections" may be established in a switched network and how a "best" connection path may be determined is discussed, based on the disclosure in U.S. Pat. No. 5,521,910 which issued May 28, 1996 to W. Matthews, entitled "Network Having Secure Fast Packet Switching And Guaranteed Quality of Service," which is hereby incorporated by reference in its entirety. While the invention is discussed in this context it is not intended to be limiting.

For example, FIG. 1 shows a fully meshed network topology having six Secure Fast Packet Switches (SFPS) labeled S1–S6; each switch is directly connected by a link L (also referred to as an "edge," or "arc"). In FIG. 1, each SFPS switch has four ports: some ports are labeled A for Access, and some are labeled N for Network. Access ports are attached to, for example, end users at a work station, and provide network access security and connection services. Network ports are attached to a communication device which groups a number of users together; these ports need not perform security services since this function has already been performed at the entry (access) port. The end systems, labeled "M_", are connected to the switches by links L. One of the end systems M10 is a network management server (NMS) which includes an SFPS switch directory and path server.

The following procedure may be followed when source M11 transmits a packet to destination M99:

1. Access switch S1 receives the packet (from M11) on inbound port A1.
2. S1 looks up in its internal connection table to determine if a valid connection (M11 to M99 mapping) exists.
3. As no connection is yet defined, S1 initiates a message exchange to the SFPS server (M10):
   a. Switch S1 sends a message asking if M11 is allowed to talk to M99. This is where security, policy, and administrative constraints are applied.
   b. If the two stations M11 and M99 are allowed to have a connection, then the server M10 determines a path of switches to provide a connection between M11 and M99.
   c. Since M11 can reach M99 by two different paths, one "best path" is selected. "Best" is determined by, for example, cost, bandwidth, policy, loss and other metrics. A discussion of how this determination may be made is set forth below.
   d. Assume the best path chosen traverses S1 to S3 to S5. Server M10 then "programs" each of these switches to support this connection path.

In the above example, the protocol is "transparent" in the M11–M99 interaction—it does not modify the packets being exchanged. In contrast, traditional switches place a connection-identifier in each packet, which is remapped at each switch, to allow the packet to be switched along the path. Here, however, SFPS treats the source medium access control (MAC) address and the destination MAC address, already present in the packet, as a unique "connection-identifier" and thus the packet need not be modified.

In this example, each switch on the path has an internal connection table with the following entries:

| Switch | Source Port | Source MAC | Destination MAC | Out Port |
|--------|-------------|------------|-----------------|----------|
| S1 | A1 | M11 | M99 | N2 |
| S3 | N1 | M11 | M99 | N3 |
| S5 | N2 | M11 | M99 | A2 |

Once all of the switches are programmed (through, for example, the Simple Network Management Protocol), the packet from M11 destined for M99, i.e.:

| Destination Address | Source Address | Data |
|---------------------|----------------|------|
| M99 | M11 | Packet date | may be "switched" along the path as follows:
M11 → A1-S1-N2 → N1-S3-N3 → N2-S5-A2 → M99

Note that once the switches have these connections defined, subsequent packets traverse M11 to M99 without requiring any additional call setup or network management interaction. This provides fast packet switching between the end systems. Note, the M11 to M99 packet exchange occurs as if they were directly connected on the same LAN segment. Thus, a "virtual LAN" is provided, as well as transparent switching.

At each switch on the path, the switch reads from the packet the source and destination MAC addresses and combines them with the inbound (source) port on which the packet is received to form the connection-identifier. If this connection is in the switch's internal connection table, the packet will be forwarded (switched) out of the designated output port according to the corresponding entry in the table.

All subsequent M11 to M99 packets will take the same path through the switches. These "virtual connections" exist until they are explicitly removed by the network management system. Thus, once a path is set up, it remains in place regardless of network activity or actual connectivity unless the path is reprogrammed.

Current LAN (local area network) switching technologies do not use link utilization knowledge, or any other metric which varies in response to how the network is being used, to select among alternative paths between pairs of sources and destinations of communication traffic. In a mesh network, the shortest path between a source and destination is the path that involves the fewest number of arcs and nodes between the source and destination. In other words, a path which traverses two nodes is shorter than a path which traverses three nodes. In some instances a fixed cost is assigned to each link. Cost can be any administratively assigned value which helps to differentiate between multiple paths. For example, the cost may be a weighting factor which differentiates between paths based on how long it will take to start a transmission on a particular arc of a path.

Because current strategies use a fixed cost associated with each link, current technologies pick the shortest path or the path with the least cost between a source and destination and continuously use that path for all traffic until some component of that path becomes disabled, and then selects an alternative path. Thus, every connection from source "A" to destination "B" will be routed through the same path. Once the shortest or least costly path is selected, no other alternative paths are considered—for this or any other connection between A and B. The selected path is used over and over again until all of the bandwidth of the path is being used. Alternative paths are ignored until the shortest path is no longer viable. This causes some path components to become congested, and in extreme cases, to fail.

In sum, when the instantaneous load of the network is unbalanced because a majority of the traffic is between a small number of sources and destinations, the network becomes heavily congested along the preferred paths between those sources and destinations. When alternative paths do exist, they are not utilized, and the network operates much less efficiently than it could.

It would thus be desirable to provide a method of distributing a communication load over multiple alternative paths in order to improve network efficiency.

SUMMARY OF THE INVENTION

According to one embodiment of the present invention, a method for selecting a communication path over which to send a communication load is provided. A number of possible communication paths between first and a second stations are identified. A first path metric is then determined for each of the possible paths. The first path metric (for each path) may have a value that varies as the distribution of loads across the network varies. One of the paths is then selected based on the first path metric.

In one embodiment, the first path metric is a function of link metrics for each link in the path. In another embodiment, a second path metric is computed. When a tie among alternative paths is identified based on the first path metric, the second path metric is used to resolve those ties.

According to another embodiment of the present invention, a communication network is provided having a source station, destination station and a plurality of possible communication paths from the source station to the destination station. The network comprises means, responsive to a first distribution of communication loads in the network, for selecting one of the possible communication paths over which to send a first communication load, and means for transmitting the first communication load from the source station to the destination station, based on the selected communication path. In one embodiment, the means for selecting includes means for determining a first path metric for each possible path, and means for selecting one of the possible paths based on the first path metric values.

These and other features and advantages of the present invention shall appear from the following description of certain exemplary embodiments.

DETAILED DESCRIPTION

As described above, in a connection-oriented network a switch may request a network management server ("NMS") to provide a path for a packet to be sent from the switch (the source) to another switch (the destination) in the network. (Of course, other mechanisms may be used to identify a path between a source and a destination.) Naturally, a number of alternative paths may exist between a source and destination. Accordingly, an efficient and effective method is required for identification and selection of a path from among the possible paths. While the following detailed description is provided with reference to an embodiment of a connection-oriented communication network having an NMS, this is not intended as limiting. The solution is applicable in general to any routing problem in a mesh network such as a communication network, whether or not the network is connection-oriented.

Figure 1:
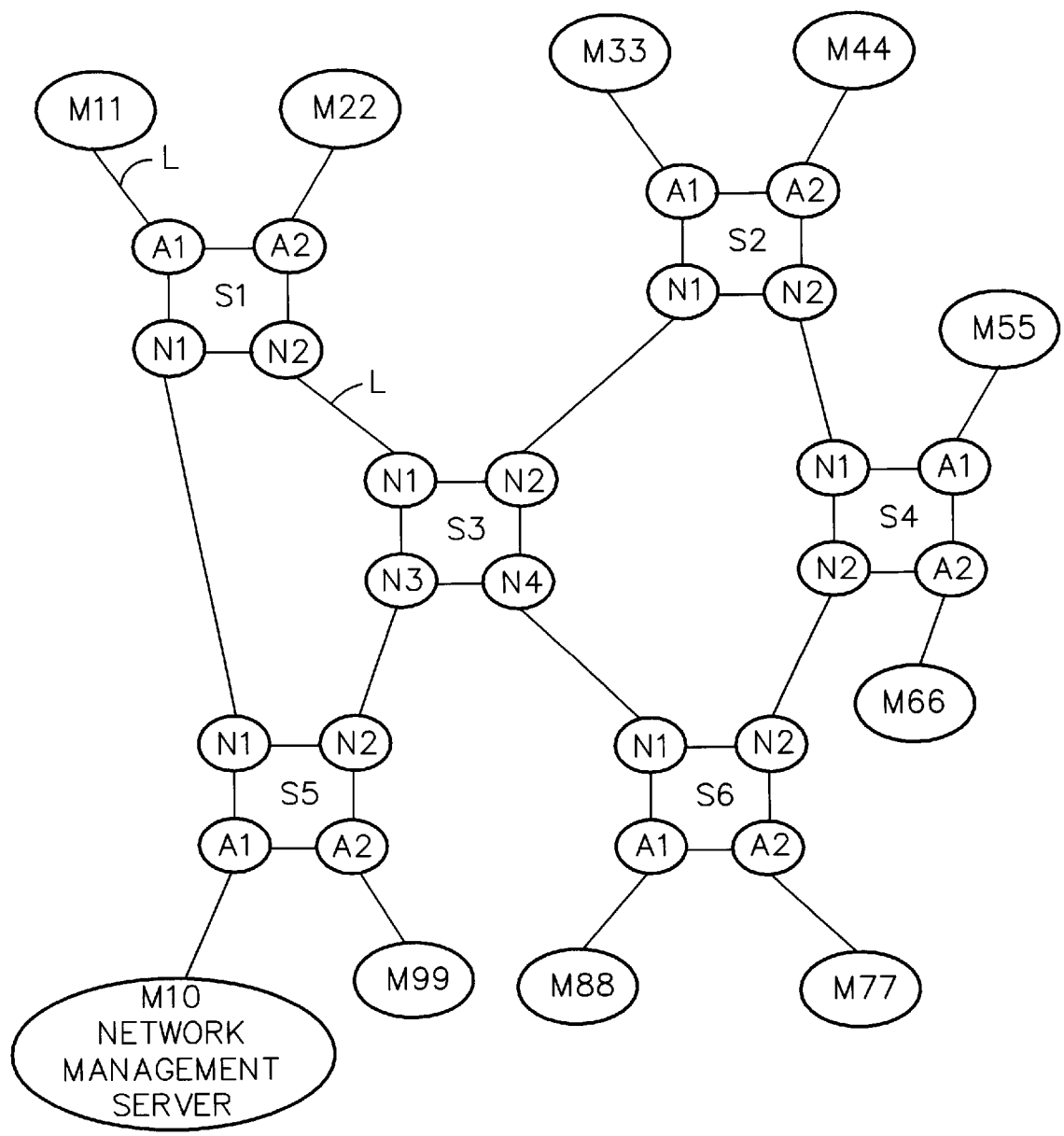
FIG. 1 is a schematic illustration of a mesh network topology with SFPS switches.
Figure 2A:
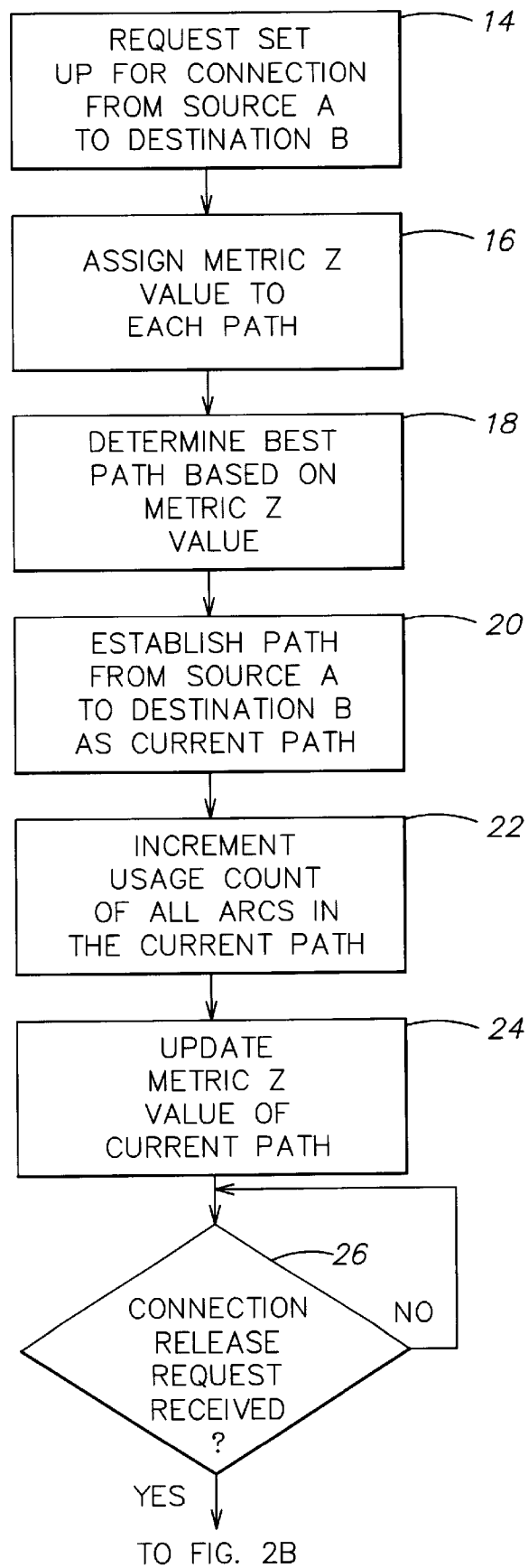
FIGS. 2A–2B are flow diagrams illustrating an embodiment of a method according to the present invention.

FIG. 2A illustrates one embodiment of a method for a distributing communication load over multiple paths, in accordance with the present invention. First, a set up request for a connection from a source A to a destination B is received (step 14).

At a step 16, potential paths are identified (discussed in greater detail below), and the potential paths are assigned a Metric Z value based on transmission criteria (such as available bandwidth and a current usage count of the path), in step 18. Various methods of determining a Metric Z value are described in greater detail below.

The "best path" is determined based upon each path's Metric Z value(s) (step 18). For example, paths having a higher bandwidth (and thus a lower Metric Z) value may be preferred over paths having a lower bandwidth (and a higher Metric Z value). The path which is determined to be the "best path" is established from the source A to the destination B and is used as the current communication path (step 20). In step 20, the path is established with network components. For switches, this may involve setting the port-to-port mappings, and for routers/gateways, this includes making changes in their routing tables, i.e., whatever path setting mechanism is appropriate to the network element. The usage count (or other metric) of all arcs (links) in the current path is then incremented (or updated) (step 22) and the Metric Z value of the current path is updated to reflect the incremented usage count (or updated metric) (step 24).

Thus, each time a connection is set up between a source and a destination, the best path is selected. If the best path changes after a connection has been set up, e.g., due to setting this connection up or to other changes in distribution of the load across the network, the next connection may be programmed through a different path.

Figure 2B:
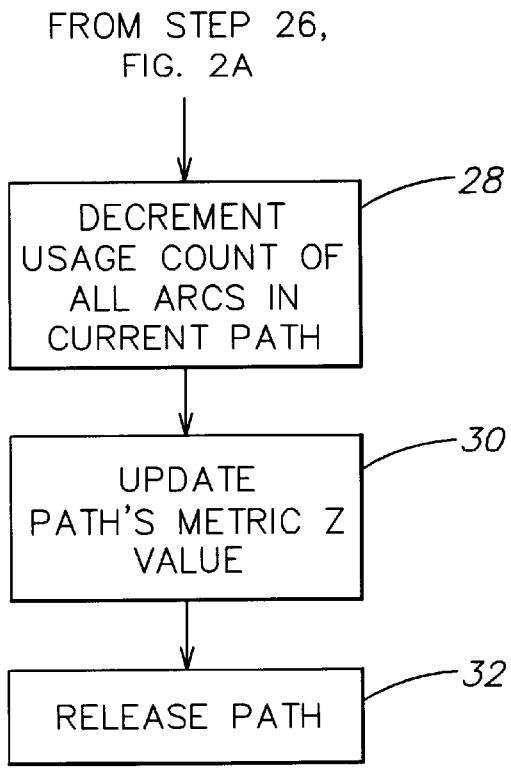

In most cases, it is expected that connections will be programmed for a short period of time before being released (see FIG. 2B). Accordingly, in practice, as connections are set up and released in the network, the communication load across the network will dynamically adjust to a more efficient distribution of load.

Identification of a return path (i.e., destination to source) may be handled separately, i.e., as a separate connection request, or as a part of the same request, i.e. routed, along the same path as the source to destination path.

In an alternative embodiment, a connection is monitored and programmed as the best path shifts, for example, in response to changes in distribution of communication loads in the network. This is more useful where the expected connection set up time is long. Another alternative is for the switch or end station to periodically release and re-request any connections it has—causing the NMS to select the current best path for additional communication.

Referring to the bottom of FIG. 2A, if a connection release request is received (step 26), the usage count (or other metric) of all arcs in the path currently being used is decremented (step 28, FIG. 2B). The path's Metric Z value then is updated in order to reflect the decrease in usage of the path (step 30) and the path is released (step 32).

Identification and Selection of Paths—Best Path Determination

As described above, alternative paths through the network are identified, and a metric is assigned to each (steps 16, 18). A procedure for determining the best path from a source to a destination, given a metric for evaluating the path, will now be discussed.

Determining a "best" path through the switches is important to insuring "fast" transmissions, avoiding bottlenecks, and guaranteeing quality of service. A procedure is described in U.S. Pat. No. 5,521,910, which is hereby incorporated by reference in its entirety.

Of course, to find a best path, the current network topology must be known by the mechanism (e.g., the NMS) designated to assign paths for communication. A number of alternatives may exist, such as those described in U.S. patent application Ser. No. 08/626,596, filed Apr. 2. 1996, which is copending and commonly owned, and hereby incorporated by reference in its entirety. The particular technique used to discover and maintain a representation of the network is not material, however, to the invention described and claimed herein—so long as the information is available to the NMS or other mechanism responsible for identifying the path.

Selection of the best path may be based upon finding a path between any two points in the mesh in which the path is optimal for one or more metrics, where a metric can be any quantifiable property which is used to determine the efficiency of a given path. The problem may also be defined as finding an optimal path through a mesh which satisfies a number of independent constraints. Alternatively, the problem may be defined as finding a path which is optimal for one metric and passes a set of threshold tests for one or more other metrics. Certain metrics are discussed in greater detail below, with reference to the Metric Z computation.

Thus, this method may be thought of, or implemented as, a breadth-first recursive search in parallel. It is initiated at a source node with an initial set of values (one for each metric) and proceeds until there are no further paths to explore. It starts with a list of all the neighbors (neighboring nodes) of the source node. It then processes that list producing another list of all the neighbors of neighbors, etc., until the destination is reached.

As each node is discovered, a traversal value vector is recorded for that node. Each element of the vector corresponds to a current value for one of the metrics. Each node in a model of the network is programmed to be aware of all arcs which originate from it (see U.S. Pat. No. 5,504,921 which describes a model-based network management system). The node reports to the model what the metric values are for the node and the arcs that originate from it. This report from the node is the traversal value vector. Each time a destination node is discovered, a traversal value vector is updated for each node.

As paths are expanded, going from the source node outward (or from the destination node outward, in an alternative embodiment), the metrics are altered in a monotonically increasing or io decreasing function. Monotonically increasing or decreasing metrics are preferred so that the metric increases or remains the same for each traversal or decreases or remains the same)—permitting pruning of possible paths that will not be the best path. Other metrics could, of course, be used.

It can be confusing to describe metrics in terms such as larger, smaller, etc. Therefore, we will use the terms "best, better, worse and worst." For example, a cost metric can be best when it is 0 and worst when it is some maximum positive value. Probability, on the other hand is best when it is 1 and worst when it is 0. Bandwidth is best if its value is a large positive number and worst when it is 0. A metric which is measured in absolute value may be best at 0 or infinity. At initiation, there is a vector of metrics which is applied at the source node. At each traversal of a node or arc (going to the destination) this vector of values is modified and produces a traversal value which accumulates from a best state to a worst state.

The method may use one or more methods of "pruning" to keep the number of potential paths explored from growing too quickly. Examples of pruning include:

When a path discovers a node already within the path, it terminates itself, i.e., further paths are not explored based on this route to that node. This prevents cycles and corresponding infinite loops.

If a path has a corresponding traversal value vector that is not better than a previously identified path (by whatever standard is chosen for selection from among alternative paths), it terminates itself.

Nodes may be initialized with a choke value vector that has "worst case" values for each metric (e.g., infinity for a cost metric, zero for a bandwidth or probability metric). Each time a path reaches that node, if any metric in the path's traversal value vector is better than the corresponding value for the choke value vector, that value is substituted in the node's choke value vector. When a path reaches a node, the path is terminated if no value in the path's traversal value vector is better than any value in the choke value vector—in this circumstance, the path is unlikely to be better than an earlier path that has already reached this node. (Although this rule does not guarantee optimal results where more than one metric is used, an optimal result will be achieved in almost all practical cases).

Any path which would traverse a disabled arc or node terminates itself.

Any path whose traversal value vector fails the filters (threshold value) in any metric, terminates itself.

Any path which encounters an end node (i.e., a node which does not forward traffic, but may be a source or sink for traffic) which is not the destination node, terminates itself.

For each successive traversal list, all the paths going into a single node are grouped together before processing. Any of these paths which is not better than the others in at least one metric is terminated.

With the above pruning steps, only paths which can potentially produce a best result in some metric are allowed to proceed toward the destination. Once there are no more paths to process, all the successful paths are evaluated, and the path which best fits the desired result for presentation is selected. The method of evaluating the paths is described below.

Of course, other implementations of best path searching, such as the well-known Djikstra's Algorithm, may be implemented.

Determination of Metric Z Value

According to one embodiment of the present invention, the metric associated with a path is "dynamic." That is, the metric can vary in response to how the load happens to be distributed across the network.

Usage can be used to provide one such measure. Usage of a link in the network reflects the current communication load on the network. In one embodiment, usage for a link is simply the number of connections programmed/routed through that link. In effect, therefore, each connection is assumed to use the same amount of bandwidth. In another embodiment, usage may be weighted to reflect the communication load for each connection programmed through the applicable link, the weighting based either on measured or anticipated traffic or a figure provided by the station requesting the connection.

The following illustrates the use of dynamic metrics.

In the following embodiments, the "Metric Z" for a path has a primary value and secondary value, and the secondary value is used only to break "ties" between two alternate paths with equal primary Metric Z values. The primary value is the summation of the Metric Z values for each arc e (same as link) in a path I. The primary Metric Z value ($Z_p$) of path I is determined as follows:

$$Z_p(i) = \sum Z_p(e), \text{ where } Z_p(e) = \frac{cost(e) * (usage(e) + 1)}{intrinsic\_bandwidth(e)}$$

where cost(e) is the cost of transmission on each arc e and usage(e) is a usage count of each arc e. Cost may simply be "one" for all arcs, or assigned a greater number if use of an arc is to be discouraged.

Thus, cost, usage and intrinsic bandwidth are metrics associated with an arc—usage being the only dynamic metric. A function of cost, usage and intrinsic bandwidth is computed to provide another (dynamic) metric for the arc. The path metric, $Z_p(I)$, is the sum of the arc metrics for each arc in path I. In the best path determination algorithm, therefore, the traversal vector includes a value for metric $Z_p$, which is updated when a new node is visited by adding the arc metric for the applicable arc.

A secondary value ($Z_s$) is determined as the summation of a different set of Metric Z values for each arc e in the path I. The Metric $Z_s$ value of a path I is determined as follows:

$$Z_s(i) = \sum Z_s(e), \text{ where } Z_s(e) = \frac{cost(e)}{intrinsic\_bandwidth(e)}$$

As shown in the above equations, Metric $Z_p$ and Metric $Z_s$ may be determined as a function of the path usage; the bandwidth of the arcs of the path; and an administrative control which establishes a bias for or against the use of specific arcs based on a specific property, such as the cost of use of the arcs. The administrative control is used to weight the Metric $Z_p$ and $Z_s$ values for each path so that the specific property, such as the cost of use of the path, is one of the determinative factors in deciding which of the paths will be chosen. For example, a first path having a high bandwidth and low usage will not be chosen over a second path having lower bandwidth and/or higher usage if the cost of using the first path renders it less efficient, based on its Metric Z value, than the second path.

In this embodiment, the path with the best aggregate Metric $Z_p$ value will be chosen. It may be a path with lower intrinsic bandwidth, but having a ratio of usage-to-bandwidth which is lower than an alternative path with higher intrinsic bandwidth, even when the number of hops (arcs) is greater. If two or more paths have the same aggregate of Metric $Z_p$ values, then the path with the minimum aggregate of Metric $Z_s$ value will be used. This metric gives a preference for the path with the highest intrinsic bandwidth.

The equations set forth above may be altered in order to stress different characteristics of the paths when determining the best path. The following embodiments (1–3) are variations of the equations disclosed above to determine the Metric $Z_p$ value and the Metric $Z_s$ value in order to stress different transmission characteristics.

1. If the goal is to avoid paths which may be susceptible to accelerated congestion or decreased available bandwidth, the following functions may be used to assign priority to the available paths:

The primary, Metric $Z_p$ value is determined for each path I containing a number of arcs e as follows:

$$Z_p(i) = \sum Z_p(e), \text{ where } Z_p(e) = \frac{cost(e) * \frac{((usage(e) + 1)^2)}{K}}{intrinsic\_bandwidth(e)}$$

where K is a scaling constant which weights the usage factor in the calculation. A higher value of K decreases the impact of the usage of the path I on the calculation, while a lower value of K increases the impact of the usage of the path I on the calculation. The secondary, Metric $Z_s$ value is determined as follows:

$$Z_s(i) = \sum Z_s(e), \text{ where } Z_s(e) = \frac{cost(e)}{intrinsic\_bandwidth(e)}$$

This variation causes fewer connections to be allocated over higher bandwidth paths before lower bandwidth paths are utilized, thereby spreading the load over more paths rather than loading up the higher bandwidth paths.

2. If the particular amount of bandwidth needed is a concern, the primary Metric $Z_p$ value may be determined as follows:

$$Z_p(i) = \sum Z_p(e), \text{ where } Z_p(e) = \frac{cost(e)}{residual\_bandwidth(e)}$$

where residual_bandwidth (e)=intrinsic_bandwidth(e)–used_bandwidth(e). In some environments, such as SFPS, used_bandwidth(e) may be an estimated value. In others, such as asynchronous transfer mode, actual data may be available.

In some embodiments, each link may be treated as multiple "pools" of bandwidth. Thus, a 100 MHz channel may be treated as four separate pools of 25 MHz bandwidth. The pools operate in a manner similar to having four separate links, each having a 25 MHz bandwidth. In this case, information in the packet header may be used for selection of the pool to which the packet would be assigned. For example, in ATM networking, the quality of service portion of the header may be used for assignment of the packet to one of multiple pools of bandwidth on a link. In this case, residual, intrinsic and used bandwidth is tracked for each pool.

Each of residual, intrinsic and used bandwidth may be tracked, notwithstanding the fact that tracking all three can be redundant (since the three have a defined relationship). Consider a link using a modem, however. During operation, the speed of the modem may fall, due to a poor telephone connection. In this case, intrinsic bandwidth for the link would also fall. To avoid the possibility of computing a negative residual bandwidth (where intrinsic bandwidth falls below the current used bandwidth), data for each of the three bandwidth measures may be maintained. If the residual bandwidth would otherwise become negative, it may simply be set to zero.

The secondary value Metric $Z_s$ is determined as follows:

$$Z_s(i) = \sum Z_s(e), \text{ where } Z_s(e) = \frac{cost(e)}{intrinsic\_bandwidth(e)}$$

This variation is preferable when an estimate of the amount of bandwidth required for a connection is available as it allows a more precise determination of which path is currently the best path to carry the communication load.

3. If the bandwidth ratio is of concern, the primary value Metric $Z_p$ may be determined as follows:

$$Z_p(i) = \sum Z_p(e), \text{ where } Z_p(e) = \frac{cost(e) * used\_bandwidth(e)}{intrinsic\_bandwidth(e)}$$

The secondary value Metric $Z_s$ is determined as follows:

$$Z_s(i) = \sum Z_s(e), \text{ where } Z_s(e) = \frac{cost(e)}{intrinsic\_bandwidth(e)}$$

As described above, additional metrics may be used. The "best" path may also be determined as some other function of the metrics (e.g., $f(Z_p, Z_s)$), or can be made optimal with respect to one metric (or function of more than one metric) while other metrics must meet a minimum threshold criteria.

The above metrics aggregate through simple addition. That is, a path metric is just the sum of each link (arc) metric. Other metrics may aggregate values in a different fashion. For example, to aggregate probability metrics, the metric of each link may be multiplied. Probability metrics that may be usefully employed according to the invention include probability of cell loss or probability of call blocking in asynchronous transfer mode communication networks. Another function for aggregating metrics would be min{ }. For example, a simple bandwidth metric would be aggregated by taking the minimum of the bandwidths of each link on the path. As discussed above, the aggregation function is, preferably, monotonic.

Figure 3:
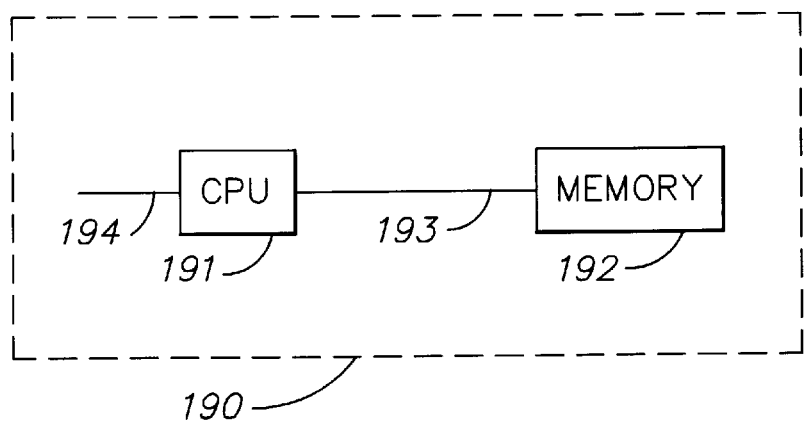
FIG. 3 is a block diagram of a computer system in which the present invention may be implemented.

Any of the above embodiments may be implemented in a general purpose computer 190 as shown in FIG. 3. The computer may include a computer processing unit (CPU) 191, memory 192, a processing bus 193 by which the CPU can access the memory 192, and access to a network 194.

The invention may be a computer apparatus which performs the functions of any of the previous embodiments. Alternatively, the invention may be a memory 192, such as a floppy disk, compact disk, or hard drive, which contains a computer program or data structure, for providing to a general purpose computer instructions and data for carrying out the methods. In a preferred embodiment, the computer is part of the Network Management Server, which determines and assigns the "best" paths for each transmission of packets. In another embodiment, the NMS is distributed across the network switches, as described in U.S. patent application 08/626,596, filed Apr. 2, 1996, which is copending and commonly owned, and which is fully incorporated by reference.

The switching technology described herein may be constructed as software and/or hardware including: software objects which exist in embedded devices as firmware; software objects which are part of an application on a commercial computer system; application specific integrated circuits (ASIC), or functionally equivalent hardware components.

Having thus described various embodiments of the invention, further modifications and improvements will readily occur to those skilled in the art and are intended to be within the scope of the invention. Accordingly, the foregoing description is by way of example only, and not intended to be limiting.

We claim:

1. A method of selecting a communication path over which to send a communication load between a first and a second station in a communication network, the communication network having a plurality of possible communication paths between the first and second stations, the method comprising the steps of:

identifying at least one of the possible communication paths between the first and second stations, wherein each of the at least one identified communication paths includes at least one link in the communication network;

determining a first path metric for each identified path, including:

determining a first link metric for each link of each identified path based on usage, an administrative cost, and an intrinsic bandwidth of the respective link; and combining the first link metrics for each link of the respective identified path; and selecting one of the at least one identified paths based on the value of the first path metric for each identified path.

2. The method of claim 1, wherein the first link metric for each link of each identified path is proportional to the administrative cost and the usage of the respective link and inversely proportional to the intrinsic bandwidth of the respective link.

3. The method of claim 1, wherein the first link metric for a link e having an administrative cost, cost(e), a usage, usage(e), and an intrinsic bandwidth, intrinsic_bandwidth(e), is a function of $$\frac{cost(e) * (usage(e) + 1)}{intrinsic\_bandwidth(e)}.$$

4. The method of claim 1, wherein the first link metric for a link e having an administrative cost, cost(e), a usage, usage(e), and an intrinsic bandwidth, intrinsic_bandwidth(e), is a function of $$\frac{cost(e) * \frac{((usage(e) + 1)^2)}{K}}{intrinsic\_bandwidth(e)}.$$

where K is a constant.

5. The method of claim 1, wherein the first link metric for a link e having an administrative cost, cost(e) and a residual bandwidth, residual_bandwidth(e), is a function of $$\frac{cost(e)}{residual\_bandwidth(e)}.$$

6. The method of claim 1, wherein the first link metric for a link e having an administrative cost, cost(e), a used bandwidth, used_bandwidth(e), and an intrinsic bandwidth, intrinsic_bandwidth(e), is a function of $$\frac{cost(e) * used\_bandwidth(e)}{intrinsic\_bandwidth(e)}.$$

7. The method of claim 1, further comprising a step of determining a second path metric for each identified path, and wherein the step of selecting comprises the step of selecting one of the at least one identified paths based on the value of the first path metric and the second path metric for each identified path.

8. The method of claim 7, wherein the second path metric is not dynamic.

9. The method of claim 7, wherein the step of selecting includes the steps of selecting all of the identified paths having an optimal first path metric and, if more than one optimal path is identified, selecting the identified optimal path having the best value for the second path metric.

10. The method of claim 9, wherein each of the at least one identified communication paths includes at least one link in the communication network and wherein:
the first path metric is based on a first link metric for each link in the respective path; and
the second path metric is based on a second link metric for each link in the respective path.

11. The method of claim 10 wherein:
the first link metric is based upon a usage of the respective link and on a bandwidth for the respective link; and
the second link metric is based on a bandwidth of the respective link.

12. A method of transmitting a communication load between a first and a second station in a connection-oriented communication network, the communication network having a plurality of possible communication paths between the first and second stations, the method comprising the steps of:

(a) defining a connection between the first and the second stations, including:
identifying at least one of the possible communication paths between the first and second stations;
calculating a dynamic first path metric for each identified path, the first path metric having a value responsive to changes of the distribution of communication loads across the network; and
selecting one of the at least one identified paths based on the value of the first path metric for each identified path;
(b) transmitting at least a portion of the communication load on the defined connection;
(c) repeating steps (a) and (b) until the transmission of the communications load is complete or the transmission is terminated.

13. The method of claim 12, wherein the step of calculating includes:
determining a first link metric for each link of each identified path; and
combining the first link metrics for each link of the respective identified path.

14. The method of claim 13, wherein the first link metric for each link of each identified path is based on a total number of connections that are currently defined on the network that include the respective link.

15. The method of claim 14, wherein the first link metric for each link of each identified path is further based on an administrative cost and an intrinsic bandwidth of the respective link.

16. The method of claim 14, wherein step (a) further comprises the step of calculating a second path metric for each identified path, and wherein the step of selecting includes the step of selecting all of the identified paths having an optimal first path metric and, if more than one optimal path is identified, selecting the identified optimal path having the best value for the second path metric.

17. An apparatus for transmitting a communication load between a first and a second station in a connection-oriented communication network, the communication network having a plurality of possible communication paths between the first and second stations, the apparatus comprising:
means for defining a connection between the first and second stations, including:
means for identifying at least one of the possible communication paths between the first and second stations;
means for calculating a dynamic first path metric for each identified path, including means for determining a first link metric for each link of each identified path and means for combining the first link metrics for each link of the respective identified path, wherein the first link metric is based on a total number of connections that are currently defined on the network that include the respective link; and
means for selecting one of the at least one identified paths based on the value of the first path metric for each identified path; and
means for transmitting the communication load on the defined connection.

18. The means of claim 17, wherein the first link metric for each link of each identified path is further based on an administrative cost and an intrinsic bandwidth of the respective link.

19. A method of selecting a communication path over which to send a communication load between a first and a second station in a communication network, the communication network having a plurality of possible communication paths between the first and second stations, the method comprising:

identifying at least one of the possible communication paths between the first and second stations;

calculating a dynamic first path metric for each identified path, the first path metric having a value responsive to changes of the distribution of communication loads across the network; and selecting one of the at least one identified paths based on the value of the first path metric for each identified path.

20. The method of claim 19, wherein each of the at least one identified communication paths includes at least one link in the communication network and the step of calculating includes:

determining a first link metric for each link of each identified path; and determining the first path metric for each identified path based on the first link metric for each link of the respective identified path.

21. The method of claim 20, wherein the first link metric is based upon a usage of the respective link.

22. The method of claim 21, wherein the first link metric is proportional to the usage of the respective link.

23. The method of claim 21, wherein the first link metric is further based on a bandwidth for the respective link.

24. The method of claim 23, wherein the first link metric is based on a combination of the usage of the respective link and the bandwidth for the respective link.

25. The method of claim 24, wherein the first link metric is proportional to the usage of the respective link and inversely proportional to the bandwidth of the respective link.

26. The method of claim 21, wherein the first link metric is further based on a cost of the respective link.

27. The method of claim 26, wherein the first link metric is based on a combination of the usage and the cost of the respective link.

28. The method of claim 27, wherein the first link metric is proportional to the usage and the cost of the respective link.

29. The method of claim 19, wherein the communications network is connection oriented.

30. An apparatus for selecting a communication path over which to send a communication load between a first and a second station in a communication network, the communication network having a plurality of possible communication paths between the first and second stations, the apparatus comprising:

means for identifying at least one of the possible communication paths between the first and second stations;

means for calculating a dynamic first path metric for each identified path, the first path metric having a value responsive to changes of the distribution of communication loads across the network; and means for selecting one of the at least one identified paths based on the value of the first path metric for each identified path.

31. The apparatus of claim 30, wherein each of the at least one identified communication paths includes at least one link in the communication network and the means for calculating includes:

means for determining a first link metric for each link of each identified path; and means for determining the first path metric for each identified path based on the first link metric for each link of the respective identified path.

32. The apparatus of claim 31, wherein the first link metric is based upon a usage of the respective link.

33. The apparatus of claim 32, wherein the first link metric is proportional to the usage of the respective link.

34. The apparatus of claim 32, wherein the first link metric is further based on a bandwidth for the respective link.

35. The apparatus of claim 34, wherein the first link metric is based on a combination of the usage of the respective link and the bandwidth for the respective link.

36. The apparatus of claim 35, wherein the first link metric is proportional to the usage of the respective link and inversely proportional to the bandwidth of the respective link.

37. The apparatus of claim 32, wherein the first link metric is further based on a cost of the respective link.

38. The apparatus of claim 37, wherein the first link metric is based on a combination of the usage and the assigned cost of the respective link.

39. The apparatus of claim 38, wherein the first link metric is proportional to the usage and the assigned cost of the respective link.

40. The apparatus of claim 30, wherein the communications network is connection oriented.

41. The apparatus of claim 30, wherein the apparatus is a network management server.

\* \* \* \* \*